Patented Sept. 20, 1932

1,877,851

UNITED STATES PATENT OFFICE

DUDLEY H. GRANT, OF MOORESTOWN, NEW JERSEY, ASSIGNOR TO STANDARD OIL DEVELOPMENT COMPANY, A CORPORATION OF DELAWARE

INSECTICIDE

No Drawing.   Application filed September 5, 1929.   Serial No. 390,655.

The present invention relates to insecticidal or insect repelling compositions containing nicotine.

One of the salient objects of the present invention is the preparation of an insecticide in which the insecticidal power of white oil or other petroleum oils is fortified by the addition of nicotine.

Another object of the invention resides in the preparation of an oil soluble nicotine salt which will not evaporate, oxidize, hydrolyze or otherwise lose its potency, on standing.

A further object is to provide an improved insecticidal or insect repelling composition which is comparatively harmless to plants.

Other objects and advantages will become apparent during the course of the following description serving to illustrate the compositions of the present invention and the method by which they may be prepared.

Nicotine is an alkaloid adapted to be used for insecticidal purposes. However, such insecticides often lose part of their effectiveness for various reasons. Thus it has been found by investigators that the deterioration of insecticides containing nicotine and fatty acid soaps is due, in the case of drying oil soaps, to condensation of nicotine with the unsaturated fatty acids, and, in the case of non-drying oil soaps, to volatilization of the nicotine.

I have discovered that nicotine becomes involatile and stable against chemical changes such as condensation when it is present in the form of its oil-soluble sulphonate. Oil-soluble sulphonic acids are formed in the treatment of petroleum oils with concentrated or fuming sulphuric acid or sulphuric anhydride. They remain dissolved in the oil after the treatment and are separated by extraction with various solvents such as isopropyl alcohol. In the preparation of the nicotine sulphonate I use the method described in U. S. application Serial No. 390,434 of H. E. Buc, filed September 4, 1929, which consists in adding an alkali metal salt of the oil-soluble sulphonic acid to an aqueous solution of nicotine or nicotine salt such as nicotine sulfate together with sufficient amount of a mineral acid to liberate the sulphonic acid and keep the whole mixture acid. The nicotine sulphonate precipitates in form of a gummy mass which is separated by filtration, or otherwise.

This compound of nicotine with an oil-soluble sulphonic acid may be advantageously used to fortify the insecticidal power of petroleum oils, preferably of the kind known as white oils, and made by intensive acid treatment of gas oil or lubricating oil fractions, such as machine oil, etc. White oils are non-volatile, colorless and transparent oils which come on the market under various trade names, such as Nujol, Marcol, Wyrol, etc. Emulsions of white oils have been previously used in the art as insecticides but their factor of safety is very limited. The concentration of oil required to kill most of the insects against which such emulsions are used is at least 2%, whereas this concentration is not always innocuous to trees in foliage, frequently causing leaf burn or other harmful effect. If the concentration of oil in the final spray is reduced to 1% or less, the danger to the trees is practically eliminated but the control of the insects is no longer efficient. By dissolving my nicotine compound in the oil the latter becomes an effective insecticide at oil concentrations lower than have hitherto been found effective. Such a combined insecticide has the further advantage that the variety of insect pests which may be controlled by it is greater than that controlled by either petroleum or nicotine alone. It is effective against such pests as aphids, red spider, red mite, scale insects, codling moth, thrips, etc.

In preparing this new insecticide, I dissolve in the white oil the required amount of a compound of nicotine with an oil-soluble sulphonic acid derived from petroleum and emulsify the solution with water by means of soap and oil-soluble sodium sulphonate or other emulsifier. The product may be marketed either in the form of a homogeneous mixture of oil, nicotine compound and emulsifier, or in the form of a stock emulsion of creamy or buttery consistency containing up to 35% of water. Its composition may greatly vary and the following example is cited only as an illustration of my process without limiting thereby the proportions, which may be employed in the preparation of my insecticide.

Example of a stock emulsion:

1 to 25% of oil-soluble sulphonate of nicotine
40–80% white oil
5–25% soap or other emulsifier
0–35% water This product is diluted with water before use to such an extent that the percentage of the petroleum white oil in the final emulsion is between 0.5—1%. Such a final spray may have the following composition.

0.03 to 0.5% of a compound of nicotine with an oil-soluble sulphonic acid derived from petroleum.
0.5–1% petroleum white oil
0.2–1% emulsifying agent
97.5–99% water It will be understood that the invention is not limited by the particulars given which may be varied within wide limits, but only by the appended claims in which it is my intention to claim the inherent novelty of the invention.

I claim:

1. An insecticide or insect repellent comprising a petroleum oil, a compound of nicotine with an oil-soluble sulphonic acid derived from petroleum, and an emulsifying agent.

2. A composition according to claim 1, containing water as a further ingredient.

3. A homogeneous insecticide or insect repellent emulsion comprising a petroleum white oil, a compound of nicotine with an oil-soluble sulphonic acid derived from petroleum, an emulsifying agent and water.

4. A homogeneous insecticide emulsion comprising

Less than 25% of a compound of nicotine with an oil-soluble sulphonic acid derived from petroleum.
Less that 80% petroleum white oil
Less than 25% emulsifying agent and water.

5. A homogeneous insecticide emulsion comprising 0.03 to 0.5% of a compound of nicotine with an oil soluble sulphonic acid derived from petroleum.
0.5–1% petroleum white oil
0.2–1% emulsifying agent
97.5–99% water

DUDLEY H. GRANT.